(12) United States Patent
Cooper

(10) Patent No.: US 7,367,285 B2
(45) Date of Patent: May 6, 2008

(54) ILLUMINATED PET LEASH

(76) Inventor: Jimmy K. Cooper, 3356 Holt Cir., Pensacola, FL (US) 32526

( * ) Notice: Subject to any disclaimer, the term of this patent is extended or adjusted under 35 U.S.C. 154(b) by 227 days.

(21) Appl. No.: 11/178,616

(22) Filed: Jul. 11, 2005

(65) Prior Publication Data

US 2006/0005785 A1 Jan. 12, 2006

Related U.S. Application Data

(63) Continuation-in-part of application No. 10/767,823, filed on Jan. 30, 2004, now abandoned.

(51) Int. Cl.
*A01K 27/00* (2006.01)
(52) U.S. Cl. ............... 119/795; 119/859; 119/792
(58) Field of Classification Search ........... 119/795, 119/792, 856, 859, 857, 863, 858, 776, 772, 119/774; 362/102, 223
See application file for complete search history.

(56) References Cited

U.S. PATENT DOCUMENTS

| | | | | | |
|---|---|---|---|---|---|
| 2,275,701 | A | * | 3/1942 | Taylor | 119/798 |
| 3,935,443 | A | * | 1/1976 | Simmons | 362/108 |
| 4,513,692 | A | * | 4/1985 | Kuhnsman et al. | 119/795 |
| 4,903,638 | A | | 2/1990 | Lacey | |
| 5,850,807 | A | | 12/1998 | Keeler | |
| 5,967,095 | A | * | 10/1999 | Greves | 119/795 |
| 6,053,129 | A | | 4/2000 | Akre | |

FOREIGN PATENT DOCUMENTS

JP O2001-269077 10/2001

* cited by examiner

*Primary Examiner*—T. Nguyen
(74) *Attorney, Agent, or Firm*—Keaty Professional Law Corporation

(57) ABSTRACT

An illuminated pet leash has an elongated light-emitting member mounted in a transparent sleeve and extending alongside a non-extensible tethering line. An electrical power is delivered to the light-emitting member, making the tethering assembly visible in the dark.

13 Claims, 2 Drawing Sheets

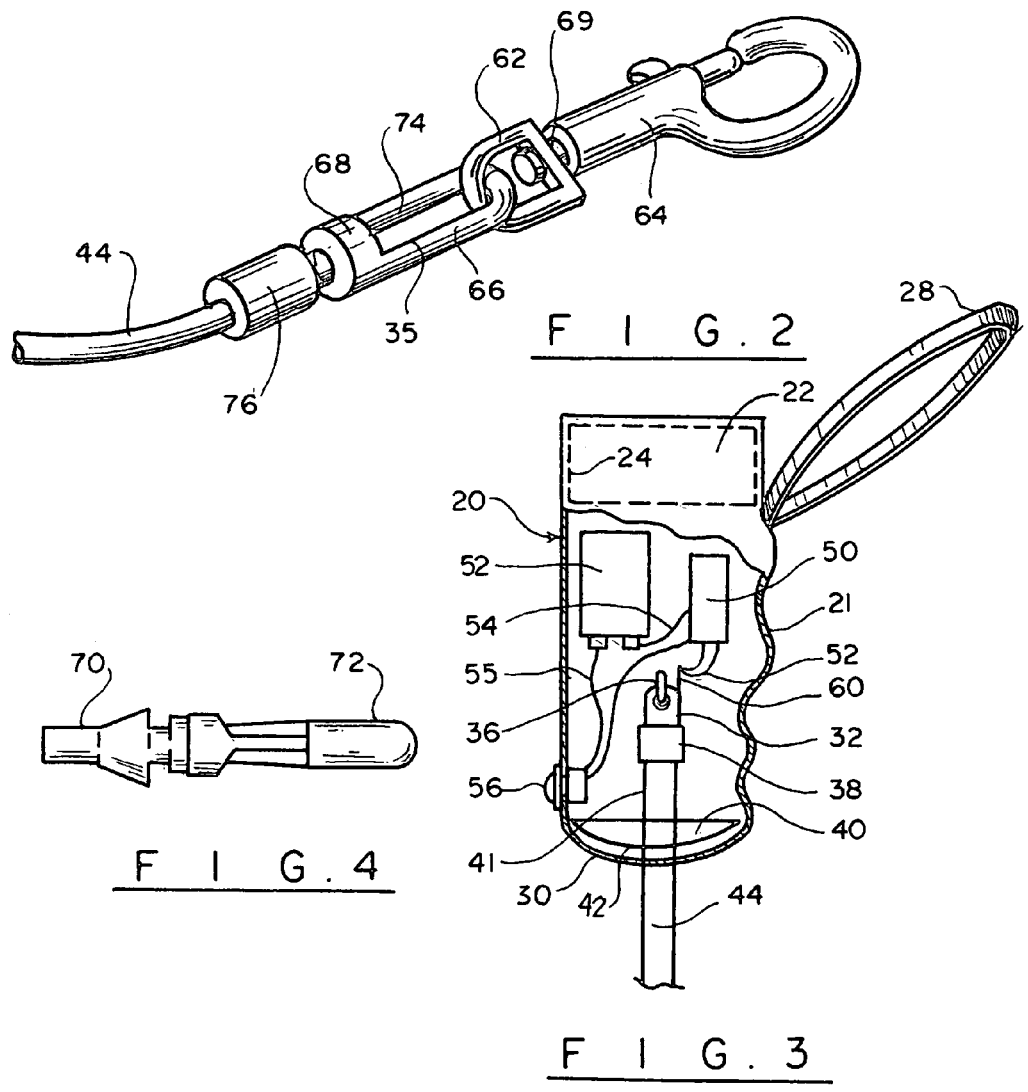
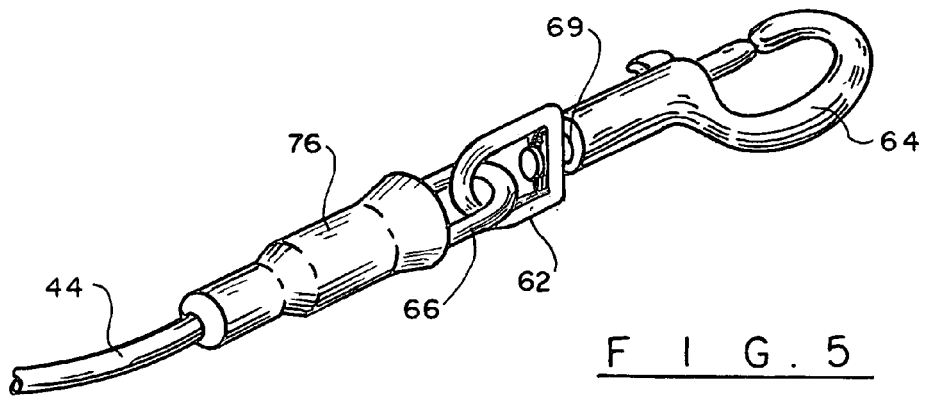

ILLUMINATED PET LEASH

CROSS REFERENCE TO RELATED APPLICATIONS

This application is a continuation-in-part of my application Ser. No. 10/767,823 filed on Jan. 30, 2004 now abandoned, entitled "Illuminating Pet Leash" the priority of which is hereby claimed and the full disclosure of which is incorporated by reference herein.

BACKGROUND OF THE INVENTION

The present invention relates to pet leashes and, more particularly, to an illuminating pet leash having an isolated tethering line, and, still more particularly, to an illuminating pet leash comprising a flexible and strong tethering line enclosed in an elongated illuminating light source assembly, wherein the tethering line is isolated from the light source assembly.

Pet leashes or other pet tethering devices are constructed to restrain the distance a pet can move from one end of the leash or tethering device being held by the owner. Therefore, the pet leash typically includes a flexible strap, made of nylon, leather, plastic or the like, or a chain of metal links secured together. The pet leash channels the pulling and tugging forces exerted by the pet to the hand hold the pet leash.

Several devices have been patented that are aimed at illuminating pet leashes or ropes, for instance, U.S. Pat. No. 5,967,095, issued to Greves, entitled "Illuminated Pet Leash," discloses a pet leash with an elongated strap having an (electro-luminescent) EL strip secured to one side of the strap. In another embodiment, the leash has a circular (or other geometric shap) strap with the EL strip spiraling around the circular strap.

U.S. Pat. No. 5,850,807, issued to Keeler, entitled "Illuminated Pet Leash," discloses an illuminated pet leash comprising an elongated non-opaque tube having a bundle of optical fibers longitudinally disposed therein.

U.S. Design Patent No. DES 422,385, issued to Callaghan, entitled "Illuminated Pet Collar and Leash Set," illustrates both a pet leash and collar having a band with spaced illuminating means attached thereto.

Other U.S. patents directed to illuminating articles include U.S. Pat. No. 5,071,118, issued to Barnett, entitled "Illuminated Jump Rope Apparatus"; and U.S. Pat. No. 5,879,076, issued to Cross, entitled "Method and Apparatus for Light Transmission".

In view of the foregoing, there is a continuing need for an illuminated pet leash that isolates the tethering line from the elongated light source while simultaneously encasing the tethering line so as not to attract from the illumination.

As will be seen more fully below, the present invention is substantially different in structure, methodology and approach from that of prior illuminating pet leashes.

SUMMARY OF THE INVENTION

It is, therefore, an object of the present invention to provide a pet leash that can be illuminated upon demand.

It is another object of the present invention to provide a pet leash, which protects the illuminating cable and prevents its break-off under the pulling force exerted by a pet.

These and other objects of the invention are achieved through a provision of an illuminated pet leash, which comprises a handle assembly comprising a housing with an electrical circuit positioned therein, a connector assembly configured for securing to a pet collar, and an elongated tethering assembly extending between the handle housing and the connector assembly. The tethering assembly comprises a light-emitting member operationally connected to said electrical circuit and a flexible tethering line extending between the housing and the connector assembly. The tethering line transmits a pulling force exerted by a pet to the handle housing without transmitting the pulling force to the light-emitting member or the sleeve, thereby protecting the sleeve and the light-emitting cable.

BRIEF DESCRIPTION OF THE DRAWINGS

Reference will now be made to the drawings, wherein like parts are designated by like numerals, and wherein

FIG. 2 is a detail perspective view of the connector assembly.

FIG. 3 is a detail cross sectional view of a handle assembly.

FIG. 4 is a detail perspective view of the snap members of a snap ring.

FIG. 5 is detail view illustrating protective sleeve engagement with the connector assembly.

DETAILED DESCRIPTION OF THE PREFERRED EMBODIMENT

Figure 1:
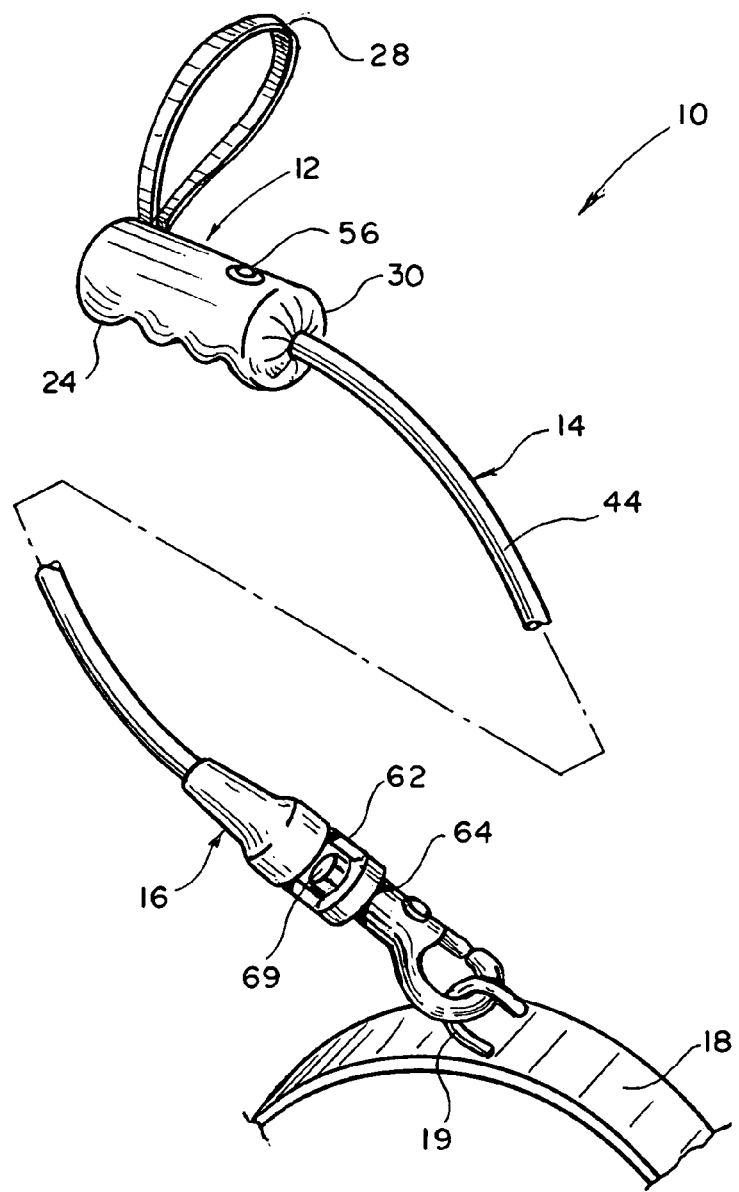
FIG. 1 is a perspective, partially exploded view of the pet leash in accordance with the present invention.

Turning now to the drawings in more detail, numeral 10 designates the illuminated pet leash in accordance with the present invention. As can be seen in the drawings, the leash 10 generally comprises a handle assembly 12, an elongated tethering assembly 14 and a means 16 for securing the tethering assembly to a pet collar 18.

The handle assembly 12 comprises a hollow housing 20 having a grip portion 21 for comfort of a user. A cap 22 has an inner end 24, which is detachably engageable with the housing 20 when inserted into the housing 20. A looped strap 28 is secured to the housing 20 above the grip portion 21. The strap 28 may be slipped on the owner's wrist, if desired.

A flexible, non-extensible tethering line 36 is secured to retainer 32 mounted inside the housing 20. The tethering line 36 extends into a coupler, or acetol fitting 38, which is housed within the housing 20. A locking ring 40 is fitted to rest transversely to an opening 42 formed in the second end 30 of the housing 20. A transparent flexible deformable sleeve 44 has a proximate end 41 secured to the coupler 38 and extending through the locking ring 40 outside of the housing 20. The tethering line 36 extends within the sleeve 44.

An electrical power inverter 50 is mounted in the housing 20. The power inverter 50 can be a DC-to-AC converter, converting power of a battery 52 for illuminating the leash 10. A connecting wiring 54 establishes an electrical connection between the battery 52 and the inverter 50. A second electrical wiring 55 extends from the battery 52 to an on/off switch 56, which is mounted on the housing 20. An Elite luminous cable 60, which is also a light-emitting member, is connected to the inverter 50 by suitable wiring 52. The cable 60, similar to the tethering line 36, extends inside the sleeve 44.

The cable 60 is capable of being illuminated when an electrical circuit is completed by pushing the "on" switch 56. The sleeve 44 being a transparent or translucent, allows the light from the cable 60 to be visible through the wall of the sleeve 44, thus providing an aesthetic and safety feature to the leash 10. The sleeve 44 is dimensioned such that the cable 60 "floats" inside the sleeve 40 without any pulling force being applied to the luminescent cable 60.

As shown in FIG. 2, an opposite end 35 of the tethering line 36 is looped over a securing ring 62 of a snap hook 64, which forms a part of the securing means 16. A snap ring 66 engages the securing ring 62. The snap ring 66 is provided with a tubular portion 68, which receives a free end of the light-emitting member 60 and the sleeve 44. The cable 60 is capped inside the tubular portion 68. The snap hook 64 is secured to the pet collar 18 with the help of an attachment member 19. A swivel member 69 of the snap hook 64 allows the tethering assembly 14 to freely rotate without entagling when the pet moves.

The snap ring 66 further comprises a pair of engageable members 70, 72 that snap together to close the loop formed by the snap ring 66. If desired, an optional tie member 74 can be added to further secure the closed engagement of the snap members 70, 72. A connector protective sleeve 76 slides over at least a part of the snap ring 66 so as to enclose the snap connections and protect the pet's hair when the tethering line is twisted. A second end of the connector protective sleeve slides over the sleeve 44.

The tethering line 36 has a discreet length, which is greater than the length of either the sleeve 44 or the cable 60; it prevents excessive stretching of the cable 60 and the sleeve 44 when a pet tugs or pulls on the leash 10. The tethering line 36 is independently connected to the leash 18 through the ring 62 and attachment member 68. As described above, the first end 34 of the tethering line 36 is rigidly connected to the handle assembly 12. In one of the exemplary embodiments, the tethering line 36 has tensile strength of about 90 pounds, doubled in strength due to the looping of the line 36 and over the ring 62 and extending the double line inside the sleeve 44. A pet tugging on the leash 10 does not break the sleeve 44 and the luminous cable 60 extending therethrough.

In operation, the owner secures the leash 10 to the collar 18 by using the snap hook 64 and grabs the handle assembly 12. If desired, the owner may slip the strap 28 over a wrist. As the pet moves, the tethering assembly can be extended to its full length but will not extend more than the length of the tethering line 36 looped between the slip hook 64 and the rivet 32. When illumination is desired, the owner may press the "on" switch 56 and cause the power to be delivered through the cable 60. When the walk is over, the owner presses on the switch 56 again and the electrical connection is interrupted. The battery 52 may be a 9-volt battery and may be rechargeable.

If desired, the handle housing 20 can be made from soft vinyl in a variety of colors. The leash can be up to 7 feet, with the illuminated part being about 6 feet. The light is distributed 360 degrees from the handle down to the snap hook. A person walking the animal at night enjoys greater safety, as the leash 10 is visible to cars. The length can be customized to make the leash longer than 6 to 7. If the inverter 50 has greater power, the leash 10 can be made significantly longer, up to 25 feet.

It is envisioned that the sleeve 44 may be wrapped around the pet's collar and make the collar portion visible as well. The sleeve 44, being made from a flexible material, with the tethering line 36 and the cable 60 being flexible as well, can be incorporated into a retractable-type pet leash. All materials used in the making of components of the leash 10 are preferably made from lightweight, non-corrosive materials.

The battery and the electrical circuit is enclosed within the handle assembly 12 and is not exposed to the environment. The battery can be easily changed by disengaging the cap 24 from the housing 20.

Many changes and modifications can be made in the design of the present invention without departing therefrom. I therefore pray that my rights to the present invention be limited only by the scope of the appended claims.

I claim:

1. An illuminated pet leash, comprising:
a handle assembly comprising a housing with an electrical circuit positioned therein;
a connector assembly configured for securing to a pet collar;
an elongated tethering assembly extending between the handle housing and the connector assembly, said tethering assembly comprising a flexible sleeve extending into the handle housing and fixedly connected at its free end to the connector assembly, a light-emitting member positioned in said sleeve and operationally connected to said electrical circuit and a flexible non-extensible tethering line extending through said sleeve into the handle housing and secured at its free end to the connector assembly, said tethering line transmitting a pulling force exerted by a pet to the handle housing without transmitting the pulling force to the light-emitting member; and a locking ring fitted into one end of said handle housing, and wherein said sleeve is an elongated light-permeable sleeve extending through said locking ring into said handle housing and secured between the handle housing and the connector assembly, said sleeve enclosing said light-emitting member and at least a part of said tethering line.

2. The apparatus of claim 1, wherein said tethering line has a discreet length at least slightly greater than the length of the elongated sleeve and the light-emitting member.

3. The apparatus of claim 1, further comprising a switch coupled to said light-emitting member for selectively transmitting power from said electrical circuit to said light-emitting member.

4. The apparatus of claim 1, further comprising a cap detachably engaged with a first end of the housing to allow access to interior of the housing upon demand.

5. The apparatus of claim 1, wherein said electric circuit comprises an independent power source and an inverter coupled to the power source and the light-emitting member.

6. The apparatus of claim 1, wherein said handle assembly comprises a coupler mounted inside the housing and secured to one end of said sleeve, said coupler facilitating extension of the light-emitting member and the tethering line independently into said sleeve.

7. The apparatus of claim 1, wherein said connector assembly comprises a snap hook securable to the pet's collar, a snap ring detachably engageable with the snap ring, and a protective sleeve slidably moveable between a first position partially enclosing said snap ring and a second position away from the snap ring.

8. The apparatus of claim 7, wherein said snap ring has a tubular member, and wherein free ends of the elongated sleeve and the light-emitting member are engaged with the tubular member.

9. the apparatus of claim 1, wherein said elongated sleeve has a proximate end extending in the housing.

10. The apparatus of claim 9, wherein said proximate end is connected to a coupler mounted in the housing, and wherein a retainer member secured with the coupler carries one end of the tethering line.

11. An illuminated pet leash, comprising:

a handle assembly comprising a housing with an electrical circuit positioned therein, said electric circuit comprising an independent power source, an inverter and an on/off switch;

a connector assembly configured for detachable securing to a pet collar;

an elongated tethering assembly extending between the handle housing and the connector assembly, said tethering assembly comprising a light-emitting member operationally connected to said electrical circuit and a flexible non-extensible tethering line extending between the housing and the connector assembly, said tethering line transmitting a pulling force exerted by a pet to the handle housing without transmitting the pulling force to the light-emitting member; and an elongated light-permeable sleeve extending into the handle housing and secured between the handle housing and the connector assembly, said sleeve enclosing said light-emitting member and at least a part of said tethering line; and a locking ring fitted into one end of said handle housing, and wherein said sleeve extending through said locking ring into said handle housing and secured between the handle housing and the connector assembly, said sleeve enclosing said light-emitting member and at least a part of said tethering line.

12. The apparatus of claim 11, wherein said tethering line has a discreet length at least slightly greater than the length of the elongated sleeve and the light-emitting member.

13. The apparatus of claim 11, wherein said connector assembly comprises a snap hook securable to the pet's collar, a snap ring detachably engageable with the snap ring, and a protective sleeve slidably moveable between a first position partially enclosing said snap ring and a second position away from the snap ring.

* * * * *